United States Patent [19]

Pawlos

[11] Patent Number: 4,971,609

[45] Date of Patent: Nov. 20, 1990

[54] PORTABLE OXYGEN CONCENTRATOR

[76] Inventor: Robert A. Pawlos, 13185 N. 91st Way, Scottsdale, Ariz. 85260

[21] Appl. No.: 475,433

[22] Filed: Feb. 5, 1990

[51] Int. Cl.$^5$ ............................................. B01D 53/04
[52] U.S. Cl. ...................................... 55/162; 55/179; 55/389
[58] Field of Search ................................ 55/161–163, 55/179, 180, 387, 389

[56] References Cited

U.S. PATENT DOCUMENTS

| | | | |
|---|---|---|---|
| 2,765,868 | 10/1956 | Parks | 55/180 X |
| 3,696,588 | 10/1972 | Dussourd et al. | 55/163 |
| 3,834,136 | 9/1974 | Dussourd et al. | 55/163 X |
| 3,934,989 | 1/1976 | Haugen | 55/163 |
| 4,231,768 | 11/1980 | Seibert et al. | 55/179 |
| 4,257,415 | 3/1981 | Rubin | 128/200.21 |
| 4,272,265 | 6/1981 | Snyder | 55/389 |
| 4,302,224 | 11/1981 | McCombs et al. | 55/160 |
| 4,314,828 | 2/1982 | Saito et al. | 55/179 X |
| 4,349,357 | 9/1982 | Russell | 55/21 |
| 4,428,372 | 1/1984 | Beysel et al. | 128/202.26 |
| 4,439,213 | 3/1984 | Frey et al. | 55/179 X |
| 4,449,990 | 5/1984 | Tedford, Jr. | 55/26 |
| 4,491,459 | 1/1985 | Pinkerton | 55/163 |
| 4,537,607 | 8/1985 | Rogers et al. | 55/163 |
| 4,552,571 | 11/1985 | Dechene | 55/179 X |
| 4,576,616 | 3/1986 | Mottram et al. | 55/68 |
| 4,584,001 | 4/1986 | Dechene | 55/162 |
| 4,627,860 | 12/1986 | Rowland | 55/162 |
| 4,632,678 | 12/1986 | Cosyns et al. | 55/180 |
| 4,648,888 | 3/1987 | Rowland | 55/21 |
| 4,681,099 | 7/1987 | Sato et al. | 128/204 |
| 4,687,013 | 8/1987 | Stevenson | 55/163 X |
| 4,756,723 | 7/1988 | Sircar | 55/25 |
| 4,787,417 | 11/1988 | Windsor, Jr. | 137/624.13 |
| 4,802,899 | 2/1989 | Vrana et al. | 55/31 |
| 4,826,510 | 5/1989 | McCombs | 55/179 |
| 4,867,766 | 9/1989 | Campbell et al. | 55/179 X |

FOREIGN PATENT DOCUMENTS

| | | |
|---|---|---|
| 195388A | 3/1985 | European Pat. Off. . |
| 239713A | 4/1986 | European Pat. Off. . |
| 258206A | 7/1986 | European Pat. Off. . |
| 55-132618 | 10/1980 | Japan ........................ 55/179 |
| 0751414 | 7/1980 | U.S.S.R. .................... 55/179 |
| 1005847 | 3/1983 | U.S.S.R. .................... 55/179 |
| 2171927A | 9/1986 | United Kingdom . |

Primary Examiner—Robert Spitzer
Attorney, Agent, or Firm—Warren F. B. Lindsley

[57] ABSTRACT

An improved portable oxygen concentrator employing one or more molecular sieve beds for selectively adsorbing nitrogen from atmospheric air for increasing the oxygen concentration of a product gas furnished to a user through a venturi tube which maintains a low pressure high flowrate of an exact concentration of the gas to a user over an extended period. The concentrator utilizes a DC or AC compressor powered by a 12 volt rechargeable battery.

6 Claims, 2 Drawing Sheets

PORTABLE OXYGEN CONCENTRATOR

BACKGROUND OF THE INVENTION

This invention relates to fractionation of air by selective adsorption and more particularly to a lightweight, low pressure, portable oxygen concentrator that furnishes exact oxygen concentrations through a venturi system at high flow rates.

Oxygen concentrators have been used extensively for supplying oxygen-enriched gas to respiratory patients, particularly those requiring relatively high oxygen concentrations in a breathable gaseous mixture over extended periods of time. Because oxygen concentrators deliver a breathable gas of between 80–95% oxygen from atmospheric air, thereby eliminating the requirement of bottled gas, oxygen cylinders, and the like, they have found substantial appeal especially in the home care field.

As reliable as oxygen concentrators have become, their power requirements are relatively high. Because of the constantly increasing costs of electricity, where such concentrators are required to operate over extended periods of time, costs of operation can be substantial even to the point of otherwise offsetting the convenience of such devices. Further, prior art devices are bulky to handle especially if the patient is amubulatory and the device must be supplied with alternative electrical power for energizing thereof.

Thus, a need exists for a portable oxygen concentrator which is lightweight, operates at a low pressure, and can provide high flow rates through a venturi system.

DESCRIPTION OF THE PRIOR ART

Although portable low profile oxygen concentrators are known wherein a gaseous mixture such as air is supplied under pressure to a bed of a physical separation medium which adsorbs at least one adsorbable component and passes at least one substantially nonadsorbable component of the mixture while a second bed is evacuated, none are known which utilizes the disclosed lightweight, portable concentrator.

U.S. Pat. No. 4,826,510 discloses an oxygen concentrator using pressure swing adsorption technology for separating any gas out of a mixture of gases.

U.S. Pat. No. 4,491,459 discloses an oxygen enrichment and concentration system that draws air from the ambient atmosphere and employs primary and secondary adsorption beds to adsorb components of the air other than oxygen.

U.S. Pat. No. 4,257,415 discloses a portable nebulizer treatment apparatus. The apparatus is portable, lightweight and includes a compressor capable of battery operation which supplies compressed air to a nebulizer. The nebulizer contains a medication which is atomized for inhalation by a patent through a mouthpiece or a facemask.

U.S. Pat. No. 4,648,888 discloses an oxygen concentrator having one or more molecular sieve beds for selectively adsorbing nitrogen from atmospheric air for increasing the oxygen concentration of a product gas.

U.S. Pat. Nos. 4,272,265; 4,802,899 and 4,302,224 disclose pressure swing adsorption apparatus for generation of oxygen which utilize one or more sieve beds.

U.S. Pat. No. 4,537,607 discloses an oxygen concentrator utilizing molecular sieve type system for breathing by aircrews to ensure a constant preset quantity of oxygen enriched air flow.

The following U.S. patents are directed to methods and apparatus for concentrating oxygen none of which employ the venturi type system disclosed and claimed herein:

| | |
|---|---|
| 4,349,357 | 4,584,001 |
| 4,428,372 | 4,627,860 |
| 4,449,909 | 4,681,099 |
| 4,491,459 | 4,756,723 |
| 4,576,616 | 4,787,417 |

The following U.K. and European Patent Office applications are of interest but not pertinent to the invention claimed herein:
United Kingdom No. 2,171,927
European Patent Office No. 195,388
European Patent Office No. 239,713
European Patent Office No. 258,206

SUMMARY OF THE INVENTION

With the wide spread use of oxygen in home health care and the expense of delivering potentially dangerous and heavy high pressure oxygen tanks, the need for an alternate system has developed. The oxygen concentrator was designed to meet that need. Like the oxygen tanks, the oxygen concentrator delivers high oxygen concentrations at low flowrates. Unfortunately, the current oxygen concentrators on the market are equally as cumbersome as tanks and also require a large amount of AC power to drive the gas through the system.

In the operation of the standard oxygen concentrator, room air is drawn through a dust filter by a cooling fan. A portion of this air is then routed through a second filter to a heavy duty air compressor, one that requires a 110 volt AC power source. After compression, the air is cooled by a heat exchanger and again filtered to remove all contaminants.

Through the valving system, the compressed air is passed to and from the compressor through a sieve bed containing molecular sieve material for a set period of time. During this time, oxygen enriched gas coming from the chamber containing the molecular sieve material is partially stored in a container called the product tank. The bulk of the oxygen produced passes through the second sieve chamber purging the accumulated gas, primarily nitrogen, to the atmosphere. Each chamber is then alternately pressurized and purged for a set period of time.

Highly concentrated oxygen is delivered from the product tank to the patient through a flowmeter at a given pressure controlled by a regulator.

In accordance with the invention claimed, an improved oxygen concentrator assembly is provided for enriching the oxygen content of air for respiratory patients which simplifies plumbing and valves to permit the system to operate with low power requirements and novel adsorption sieve designs to provide a lightweight portable system. The apparatus employs a venturi system through which the product gas is passed to achieve high flowrates at exact oxygen concentrations.

It is, therefore, one object of this invention to provide a new lightweight, portable, low pressure oxygen concentrator that provides exact oxygen concentrations through a venturi system at high flowrates.

Another object of this invention is to provide a new and improved oxygen concentrator that employs a plurality of filters for filtering the atmospheric air prior to compression which after compression is cooled, passed through a molecular sieve and then a venturi system to the user.

A further object of this invention is to provide an improved oxygen concentrator that greatly reduces the workload of a compressor since only a small amount of the resulting gas high in oxygen concentration is needed in the system prior to entering the venturi port for distribution of an exact blend of an oxygen concentration to the patient.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawings, in which.

DESCRIPTION OF THE PREFERRED EMBODIMENT

Figure 1:
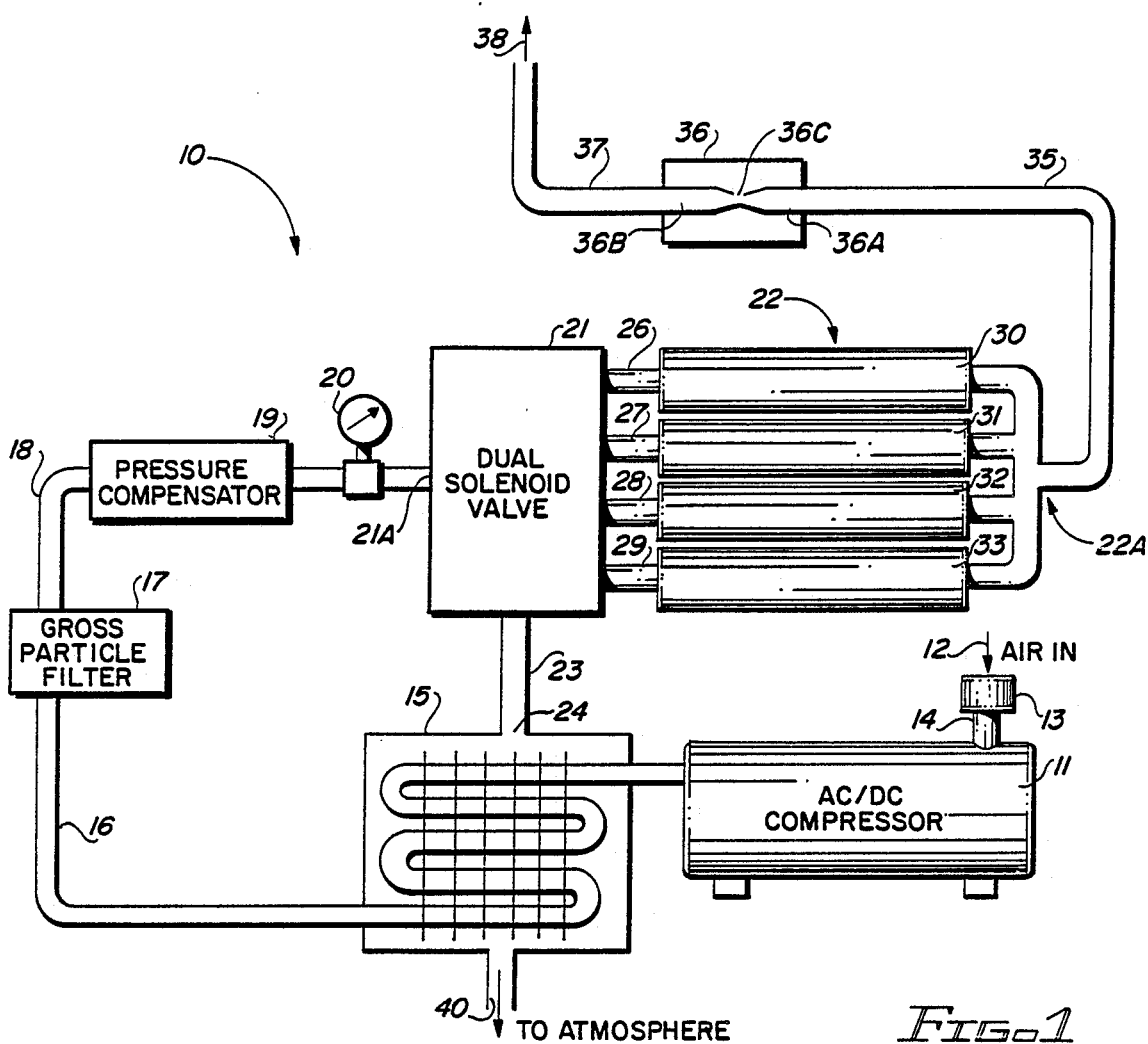
FIG. 1 discloses a block diagram of an improved oxygen concentrator embodying the invention in its basic form.

Referring more particularly to the drawings by characters of reference, FIGS. 1-4 disclose a portable oxygen concentrator 10 comprising a compressor 11 the fan of which draws atmospheric air 12 through a filter 13 and channel tubing 14 into the compressor where it is compressed to a low pounds per square inch (PSI) value.

Figure 3:
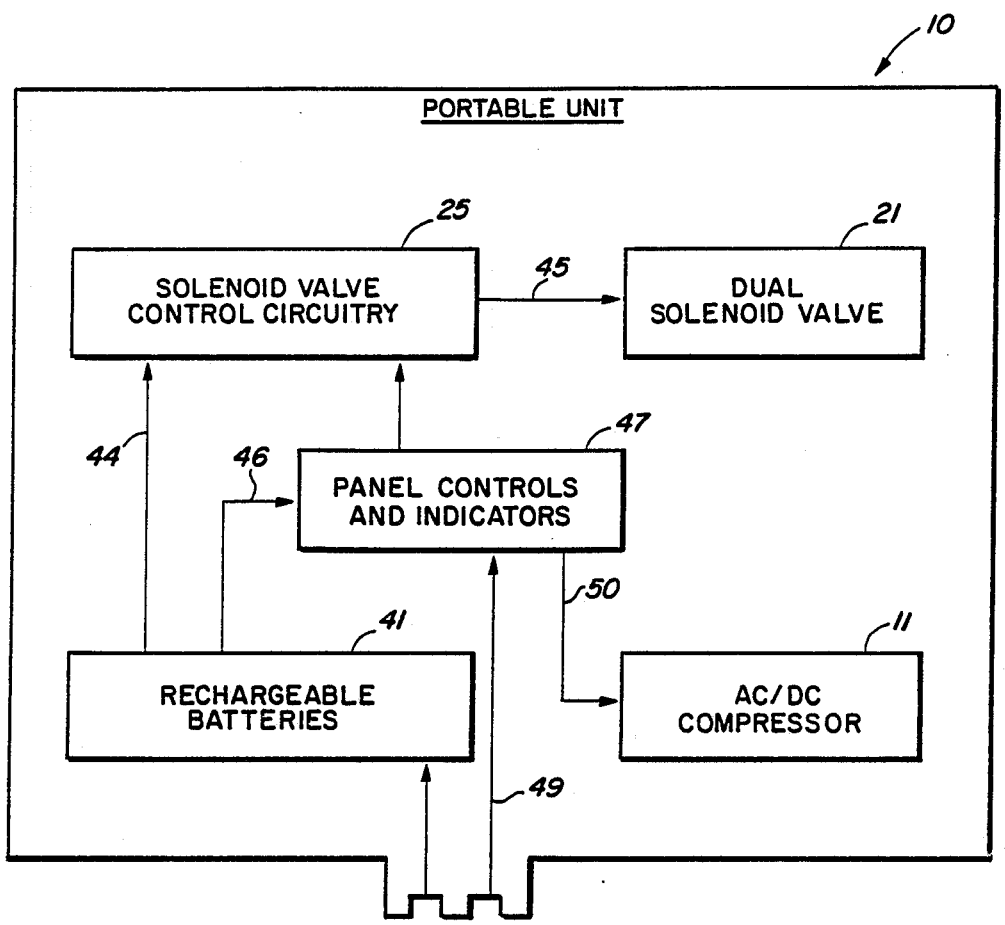
FIG. 3 illustrates in block diagram an electrical system for energizing the functional elements of FIG. 1.

Compressor 11 is operable when connected to a 12-volt direct current electric power source, as shown in FIG. 3. The compressor can be a standard reciprocating piston air compressor motor capable of a flow between 69 and 150 liters per minute at a pressure of between 5 and 80 pounds per square inch. Optionally, a rotary compressor having the same specifications can be used. After compression to a low PSI, the compressed air is transmitted through a heat exchanger 15 with the cooled compressed gas transmitted through a passageway or pipe line 16 and gross particle filter 17 to remove any remaining contaminants.

The gross particle filter 17 removes dust, soot and other particulate matter from the air as it is drawn into the system. This particulate matter would seriously interfere with the efficient operation of the remaining elements of the system if not removed.

The filtered and/or purified air under pressure from compressor 11 is transmitted through passageway or pipe line 18 to and through a pressure compensator 19 and pressure gauge 20 to a dual solenoid valve 21.

Solenoid valve 21 supplies gas selectively to diamond shaped sieve beds 22 and through passageway or pipe line 23 to an exhaust vent 24. This vent may be directed at the heat exchanger 15 to aid in cooling of the compressed air passing therethrough.

The timing cycle for operating solenoid valve 21 is regulated by a controller comprising solenoid valve control circuity 25 shown in FIG. 3, which inter alia provides a purging function for sieve beds 22 and includes timing means for switching the valve.

The sieve beds 22 are membrane stacks of a type well known in the art which partially adsorbs gas molecules in the air other than oxygen and argon. Suitable for the membrane stacks are filters heavily implanted with an inorganic silicate material held together with a clay base and shaped in a granular form with a minimum of two flat sides to give maximum surface or molecule adsorption area.

Figure 2:
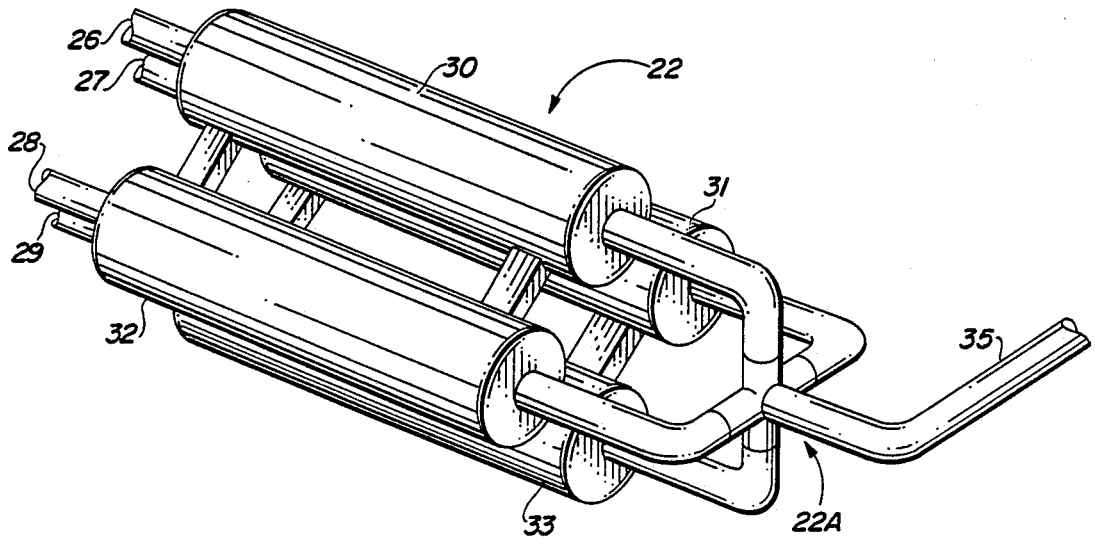
FIG. 2 is an illustration of the sieve bed design forming a part of the apparatus shown in FIG. 1.

As shown in FIG. 2, the inorganic silicate material may be formed in beds having diamond shaped configuration for functioning more effectively.

The solenoid valve 21 may be a four way valve having four output ports 26, 27, 28 and 29 with each port connected to a different one of the sieve beds 30, 31, 32 and 33 as shown in FIG. 1. This valve may also comprise less than four valve outlets connected to one or more sieve beds and still fall within the scope of this invention.

The four-way solenoid valve 21 operates such that when sieve bed 30 is connected to input port 21A of valve 21 its output ports 26, 27 and 28 will be connected to sieve beds 31, 32 and 33 for purging functions.

These sieve beds containing a suitable sieve material such as inorganic silicate adsorb molecules other than oxygen and argon from the air. One satisfactory inorganic silicate is MG.3, manufactured by Linde-Union Carbide.

It is known that air is approximately 21% oxygen and 78% nitrogen. Therefore, increasing the oxygen content of the air primarily involves removing nitrogen from the air to reduce the nitrogen content below that of normal atmospheric air.

When port 26 of valve 21 is open, air drawn into the system by compressor 11 enters the first sieve bed 30. The output of this sieve bed is medical grade oxygen and flows through passageway or pipe line 35 to and through a venturi tube 36, passageway or pipe line 37 to a user 38. A portion of the air entering the four way valve 21 is forced through the second, third and fourth sieve beds 31, 32 and 33 to atmosphere through exit port 40 to purge impurities therefrom.

The compressed air that enters sieve beds 31, 32 and 33 absorbs the nitrogen and other molecules previously adsorbed by the sieve material during a previous cycle of the system. This purged gas then is exhausted through port 40 to atmosphere.

When four way valve 21 is operated a second time it opens port 27 with compressed air then flowing through sieve bed 31 and then through pipe line 35, venturi tube 36, pipe line 37 to user 38 with sieve beds 30, 32 and 33 being purged as mentioned above.

Apparatus 10 operates in a four-stage cycle. While the first sieve bed 30 is providing enriched oxygen directly to a patient or to a tank 22A, the second, third and fourth sieve beds 31, 32 and 33 are being purged to prepare the system for the second stage of the cycle. In the second stage of the cycle, the second sieve bed 31 supplies enriched oxygen to coupling or reservoir 22A or directly to the patient while the first, third and fourth sieve beds are being purged to prepare the system for the third stage of the cycle. This continues through four stages with each sieve bed being utilized to supply enriched oxygen to the tank or patient.

With this system small amounts of compressed air may be utilized since the purging action occurs more than one time before a sieve bed is used for generating oxygenated air to tank 22A or the patient.

The venturi tube 36 is utilized as a regulator for providing a high flow rate of exact oxygen concentration at a low pressure via nasal prongs, mask, transtracheal catheter, etc. to a user.

This venturi or venturi tube or system comprises a short tube having flared ends 36A and 36B that is inserted in the pipe lines 35 and 37. Its constructed middle section 36C forms a throat that depends for operation upon the fact that as the velocity of the flow of a fluid increases in the throat the pressure decreases. Thus, as the product gas from the sieve beds passes through the venturi tube it is reduced in pressure and volume. The user, thereby, has a regulated source of low pressure high oxygen content gas for breathing purposes taken from the atmospheric air surrounding the concentrator.

Figure 4:
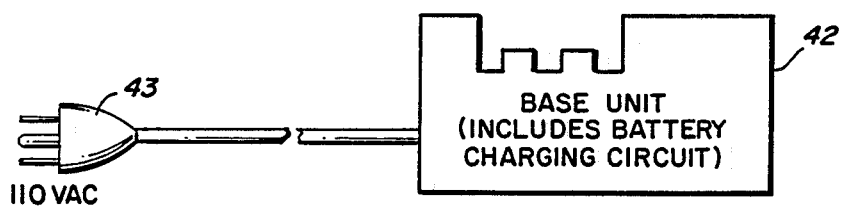
FIG. 4 discloses a recharging device for the rechargeable batteries shown in FIG. 3.

In order to properly function as a lightweight portable device, concentrator 10 must be energized and controlled by a suitable rechargeable battery system. As shown in FIG. 4, rechargeable batteries 41 are recharged continuously or periodically by a rectifier and charger 42 which is connected to a 110 V alternating current(AC) source 43.

The direct current source provided by the rechargeable batteries 41 is transmitted through conductors 44 to the solenoid valve control circuitry 25 which controls, through conductor 45, solenoid control valve 21.

The rechargeable batteries 41 through conductor 46 energize the panel controls and indicators 47 which in turn energize the AC/DC compressor 11 through conductor 50.

Indicators 47 also display the fact that the batteries are being recharged by the signal being furnished the panel controls and indicators 47 through conductor 49 interconnecting the rechargeable base unit 42 and the panel contacts 47 as shown in FIGS. 3 and 4.

Although but one embodiment of the invention has been illustrated and described, it will be apparent to those skilled in the art that various changes and modifications may be made therein without departing from the spirit of the invention or from the scope of the appended claims.

What is claimed is:

1. A portable oxygen concentrator for generating a product gas of a predetermined oxygen concentration and delivering it to a user at a relatively high flowrate comprising:

an electrically energized compressor for receiving filtered air from the atmosphere and compressing it to a low pounds per square inch pressure, a heat exchanger for receiving a compressed air product from said compressor for cooling it to a predetermined temperature, a gross particle filter means for receiving the cooled compressed air product and transmitting it to a solenoid valve, a solenoid valve comprising a plurality of valve means for receiving said cooled compressed air product from said filter means, a plurality of molecular sieve beds for receiving said cooled compressed air product from said filter means for selectively adsorbing nitrogen therefrom to increase the oxygen concentration of the oxygen enriched compressed air product recovered therefrom, said solenoid valve comprises valving means for selectively directing a portion of said cooled compressed air product from said filter means to one of a plurality of sieve beds for increasing the oxygen content of said portion of said cooled compressed air product to form said enriched compressed air and the remainder of said cooled compressed air being directed through the remainder of said sieve beds to purge them of at least a part of their nitrogen adsorption, a reservoir for receiving said enriched compressed air product from said one of said sieve beds, flow control means for withdrawing said enriched compressed air product from said reservoir, said control means comprises a venturi tube for receiving said enriched compressed air product therethrough, blending it with a predetermined amount of atmospheric air connecting said venturi tube with a user, and electrical control means for selectively operating said compressor and said solenoid valve.

2. The portable oxygen concentrator set forth in claim 1 wherein:

a portion of the remainder of said cooled compressed air is directed through the remainder of said sieve beds and said heat exchanger for cooling purposes.

3. The portable oxygen concentrator set forth in claim 1 in further combination with:

a pressure compensator interconnecting said filter means and said solenoid valve for regulating the pressure of said cooled compressed air received by said solenoid valve.

4. The portable oxygen concentrator set forth in claim 1 wherein:

said compressor comprises a direct current 12 volt electric motor.

5. The portable oxygen concentrator set forth in claim 4 wherein:

said electrical control means comprises at least one rechargeable battery, and rectifier means connectable to said concentrator for recharging said battery.

6. The portable oxygen concentrator set forth in claim 1 wherein:

said sieve beds comprise cylinders of equal length filled with inorganic silicate material and stacked in a diamond shaped configuration.

* * * * *